UNITED STATES PATENT OFFICE.

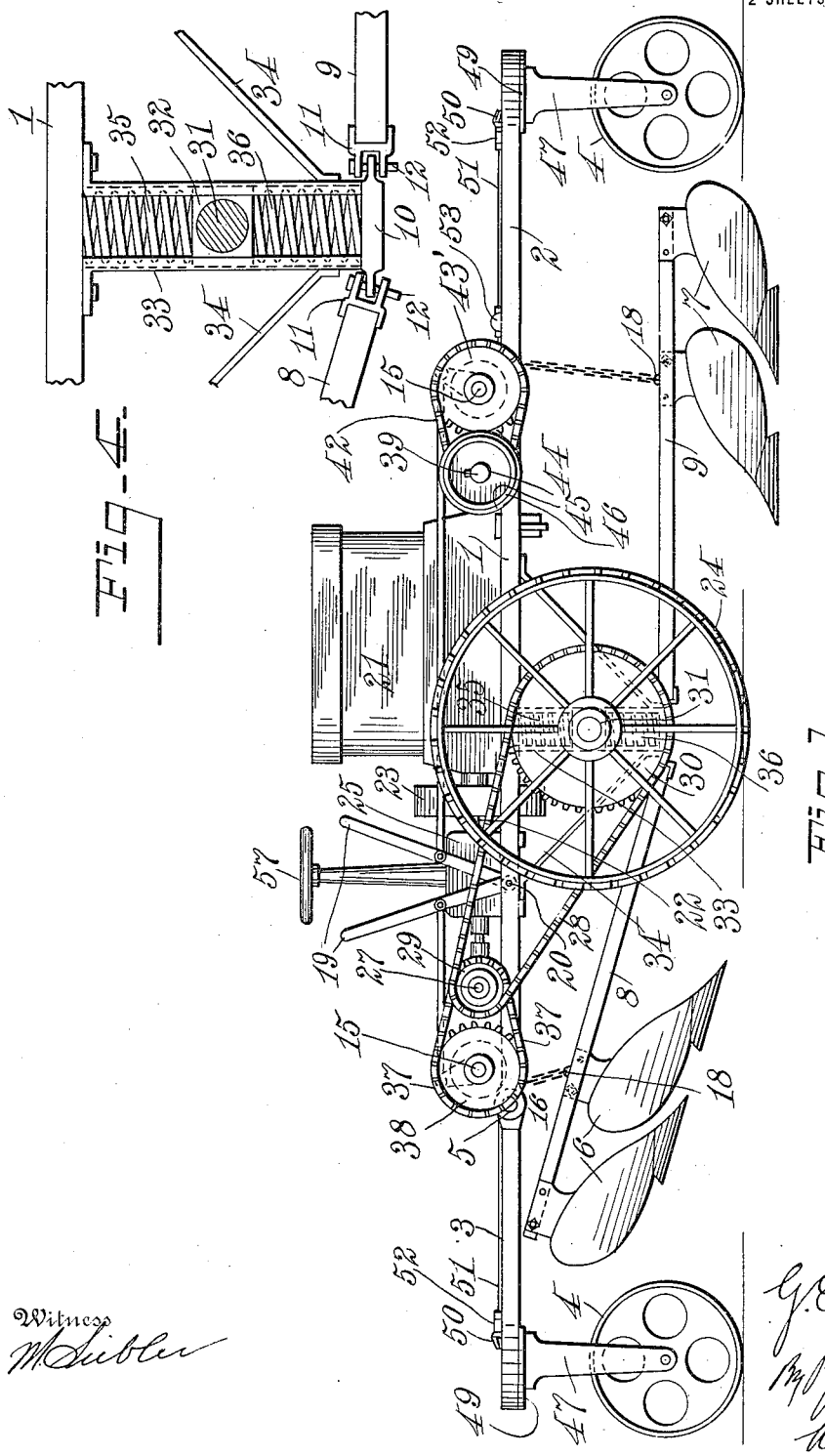

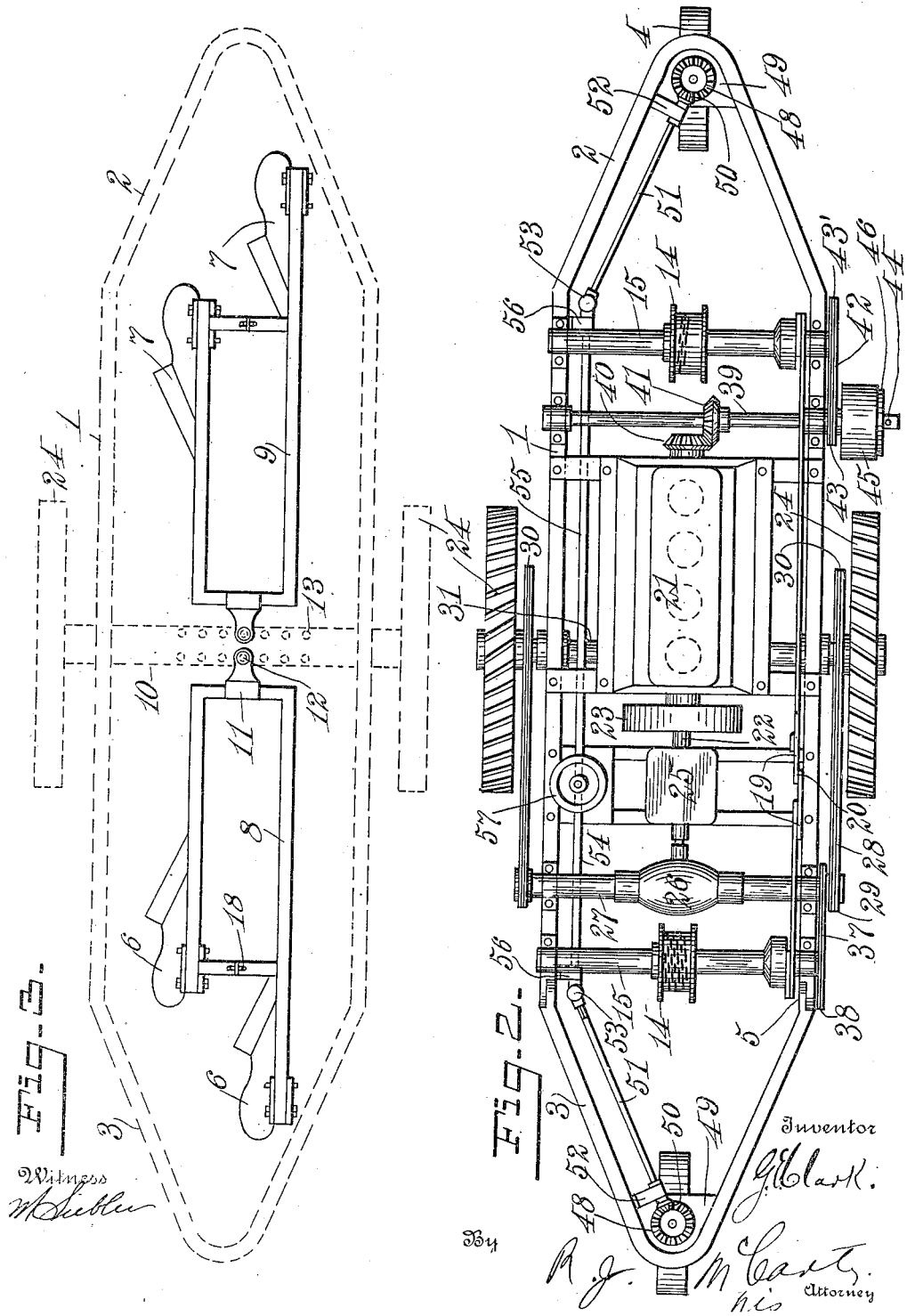

GILBERT E. CLARK, OF DAYTON, OHIO; EDNA PROCTOR CLARK ADMINISTRATRIX OF THE ESTATE OF SAID GILBERT E. CLARK, DECEASED.

FARM-TRACTOR.

1,293,714.        Specification of Letters Patent.     Patented Feb. 11, 1919.

Application filed May 29, 1918. Serial No. 237,195.

*To all whom it may concern:*

Be it known that I, GILBERT E. CLARK, a citizen of the United States, residing at Dayton, in the county of Montgomery and State of Ohio, have invented certain new and useful Improvements in Farm - Tractors, of which the following is a specification.

This invention relates to new and useful improvements in farm tractors. The objects of the invention are several, namely to provide a farm tractor which is easily manipulated in opposite directions without necessitating a turning of the machine. This chief characteristic of the invention involves a specific character of frame or running gear construction, one end of the frame being of a flexible character which enables the tractor to enter hilly soil, the other end being of a rigid character and each end having its own particular guide wheel. The invention involves also the plow beams and their connection with the frame, which enables the plows to be raised from the ground by the power of the tractor, also the feature of a floating axle for the tractor wheels which enables the tractor to travel at a minimum of effort, and other features that will be hereinafter referred to in describing my improved tractor in detail.

Referring in a preliminary way to the accompanying drawings, Figure 1 is a side elevation of a tractor constructed in accordance with my invention showing the motor, transmission and differential. Fig. 2 is a plan view thereof. Fig. 3 is a plan view showing the tractor frame and wheels in broken lines and the plows and plow beams in full lines relative to the tractor frame. Fig. 4 is a detail construction view showing one of the elastic bearings for the axle of the tractor wheels.

In a detail description of my invention similar reference characters indicate corresponding parts in the several views of the drawings.

The tractor frame is of steel and consists of parallel side members 1—1 which terminate at each end in tapered portions 2—2 and 3—3 respectively. These tapered ends form two sides of a triangle and they support at their centers or farther forward points, guide wheels 4—4. Owing to the uniformity of the end construction either end may be properly termed the front or rearward end according to the direction in which the tractor is moving. One of these tapered ends, to-wit, that designated 3, is hinged at 5 to the main frame and therefore it has a characteristic of floating as its respective guide wheel traverses the uneven ground. Arranged at each end or rather on each side of the middle of the machine, is a set of plows 6—7 coupled to their respective beams 8 and 9. These plows are secured to the beams in the usual manner and each beam is constructed to accommodate more than one plow. The said beams are constructed in rectangular form with one side member thereof projecting or extending in advance of the other so that the plows may occupy different positions. The said plow beams 8 and 9 have each an adjustable connection with a draw bar 10 by means of a clevis 11 which receives the pivot pin or bolt 12 which enters any of the openings 13 in the draw bar 10. Each set of plows is so coupled to the draw bar that they may be elevated to remove one set of plows or the other from the ground while the other is in operation. The plows may be backed and raised from the ground by the power of the tractor. The flexible connections are best shown in Fig. 4 where a portion of one plow beam is elevated. The plows are elevated or lowered each set by means of a windlass 14, one of which is arranged at each end of the frame upon shafts 15 which are supported in suitable bearings on the frame of the tractor. Chains 16 and 17 are connected to the beams which are provided with hooks 18 for this purpose, and the chains pass each over its respective windlass and connect each with an operating lever 19 fulcrumed to the frame at 20. The power to drive the tractor is furnished by a gasolene motor 21 which is suitably mounted upon the frame. The power shaft 22 with fly wheel 23 thereon drives the tractor wheels 24 through the transmission gear within gear box 25, and differential gear within gear casing 26. The differential gear driven shaft 27 drives the tractor wheels 24 through chain drives consisting of chains 28, wheels 29 on shaft 27, and chain wheels 30 on the axle 31 of the tractor. The tractor axle 31 is of a floating type in that it is journaled in movable bearings 32 on each side of and below the frame sides 1—1. These bearing pieces 32 are guided in boxes 33 secured to the parallel side members 1 of the frame and to the draw bar 10, and in addition thereto brace rods 34 extend from the lower portions of the boxes 33 on each side to the side frame members 1. Within said boxes 33 are upper and lower springs 35 and 36 between the ends of which the axle bearings 32 are confined. These springs are of sufficient strength to properly support the tractor axle 21 in a cushion-like manner and permit it to have a proper range of movement under all conditions of travel. One of the windlass shafts 15 is driven from the differential gear shaft 27 through chain 37 which encircles a chain wheel 38 on the said windlass shaft 15, and the other windlass shaft 15 is driven from the direct engine driven shaft 39 through bevel gears 40 and 41, the former gear being on the engine shaft. The engine driven shaft 39 is journaled in suitable bearings in the side frame members 1—1 and the said shaft 39 is connected through a chain 42 and chain wheel 43 and 43′ to the windlass shaft, chain wheel 43′ being on the windlass shaft 15 at that end of the machine having the rigid end frame 2. An end of the shaft 39, to-wit, 44, is formed to receive a detachable crank for starting the engine and said shaft is provided with a pulley 45 through means of which power may be transmitted from the tractor to be utilized for other purposes than driving the tractor in the utilization of the plows or other devices. The shaft 39 is also controlled by a clutch 46 in the transmission of power for such other purposes. The guide wheels 4—4 at either end of the frame is operated to guide the tractor by the following means. Each of said guide wheels is mounted in a hanger 47 which is suspended from the extreme end of one or the other of the frame ends. The upper end of each hanger 47 is provided with a facial gear wheel 48 which is above a bearing which serves as a turn bearing 49. Geared to the facial gears 48 are bevel gears 50 on rods 51 having bearings 52 and a universal joint 53. The universal joints 53 connect the rods 51 to rods 54 and 55 which lie along on the inside of one of the frame members 1 and have bearings 56 on said side frame member. The rods 54 and 55 are operated from a steering wheel 57 which is suitably connected to each of said rods so that in one direction of movement of the steering wheel 57, one guide wheel 4 will be operated or turned and in an opposite turn of the steering wheel the other guide wheel 4 will be turned.

In illustrating the various features of my improved tractor I have omitted certain necessary features thereof in order to avoid concealing any parts of the mechanism that it may be more important to here disclose, for example, the fenders are omitted and likewise the seat for the operator. These features, however, it will be understood are to be arranged and placed in position to meet the requirements, particularly the seat for the operator. This seat is to be of a semicircular form and arranged in suitable proximity to the steering wheel. It is of an arc-like or semi-circular shape to partially surround the steering wheel in order that the operator may assume a position looking toward either end of the tractor or he may assume a position looking in various directions to the side of the machine or to either end. It will be observed that either end of the tractor might be termed the front end according to the direction in which the machine is traveling. The end 2 which is connected to the main body of the frame by pivots, yields more readily to the character of the ground in traveling owing to its pivotal connections 5 but it will be understood that this end as well as the other end may be the forward end of the machine according to the direction of movement. The tractor in its operation makes but one track, for example, one of the guide wheels being in the lead, the other one travels in the furrow being formed, while one of the tractor wheels travels in the old furrow with the other tractor wheel on top of the ground.

Having described my invention I claim:

In a tractor of the type specified, a frame terminated in pointed ends one of said ends being pivoted to the frame, guide wheels mounted in the ends of said frame and adapted to swivel in their supports, connecting rods geared to said guide wheels and connected by universal joints whereby said guide wheels may be turned to direct the course of travel of the machine, plow beams mounted on each side of the transverse center of the frame and having a pivotable connection with the draw bars, plows carried by said beams, said plow beams and plows being adjustable on the draw bar to any positions relative to the soil, a chain and windlass for each plow beam whereby said beam and the plows therewith may be elevated to free the plows from the ground when one or the other set of plows is out of use, a tractor axle, wheels mounted on said axle, and elastic bearings inclosing said axle above and below and forming cushion supports therefor, substantially as specified.

In testimony whereof I affix my signature.

GILBERT E. CLARK.

Copies of this patent may be obtained for five cents each, by addressing the "Commissioner of Patents, Washington, D. C."